US012359966B2

(12) United States Patent
Wohlers et al.

(10) Patent No.: US 12,359,966 B2
(45) Date of Patent: Jul. 15, 2025

(54) MIRROR CLIP

(71) Applicant: THERMO FISHER SCIENTIFIC (BREMEN) GMBH, Bremen (DE)

(72) Inventors: Dirk Wohlers, Bremen (DE); Jan Rathkamp, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 801 days.

(21) Appl. No.: 17/629,765

(22) PCT Filed: Jul. 30, 2020

(86) PCT No.: PCT/EP2020/071462
§ 371 (c)(1),
(2) Date: Jan. 24, 2022

(87) PCT Pub. No.: WO2021/018991
PCT Pub. Date: Feb. 4, 2021

(65) Prior Publication Data
US 2022/0364916 A1    Nov. 17, 2022

(30) Foreign Application Priority Data

Jul. 31, 2019   (GB) ...................................... 1910921

(51) Int. Cl.
*G01J 3/02*     (2006.01)
*G01J 3/443*    (2006.01)
(Continued)

(52) U.S. Cl.
CPC ............. *G01J 3/021* (2013.01); *G01J 3/0202* (2013.01); *G01J 3/443* (2013.01); *G02B 7/1821* (2013.01); *H05H 1/30* (2013.01); *H05H 2240/00* (2013.01)

(58) Field of Classification Search
CPC ........ G01J 3/021; G01J 3/0202; G02B 7/182; G02B 7/1821; G02B 7/1822; G02B 7/1824

See application file for complete search history.

(56) References Cited

U.S. PATENT DOCUMENTS 5,483,337 A    1/1996   Barnhard et al.
6,043,863 A    3/2000   Ikeda
(Continued)

FOREIGN PATENT DOCUMENTS

CN    207590396 U    7/2018
EP    0054295 A2    6/1982
(Continued)

OTHER PUBLICATIONS

Ludwig, EP2018817A1, Jan. 28, 2009, Machine Translation into English.*
(Continued)

*Primary Examiner* — Ryan D Howard
(74) *Attorney, Agent, or Firm* — ALG Intellectual Property, LLC

(57) ABSTRACT

A mirror clip for use in an optical mirror housing for an optical emission spectrometer includes a body having a mirror seating portion, at least one hinge member for positioning and attaching the clip to an optical mirror housing, and at least one clamping member for releasably securing the mirror clip to the optical mirror housing. A mirror can be accommodated in the mirror seating portion. The at least one hinge member may include a hook to provide a releasable hinged connection between the mirror clip and the optical mirror housing.

23 Claims, 8 Drawing Sheets

(51) Int. Cl.
    *G02B 7/182*     (2021.01)
    *H05H 1/30*     (2006.01)

(56)     References Cited

U.S. PATENT DOCUMENTS

2003/0137708 A1    7/2003    Takase
2004/0078115 A1    4/2004    Vila

FOREIGN PATENT DOCUMENTS

| | | |
|---|---|---|
| EP | 1139136 A2 | 4/2001 |
| EP | 2018817 A1 | 1/2009 |
| EP | 2113739 A2 | 11/2009 |
| GB | 2582948 B | 12/2021 |
| JP | S5752849 U | 3/1982 |
| JP | H05107445 A | 4/1993 |

OTHER PUBLICATIONS

Combined Search and Examination Report dated Dec. 5, 2019, GB Patent Application 1910921.4.
International Search Report and Written Opinion mailed on Oct. 27, 2020, to PCT Application No. PCT/EP2020/071462.

\* cited by examiner

MIRROR CLIP

CROSS-REFERENCE TO RELATED APPLICATIONS

This application is a National Stage application filed under 35 USC § 371 of International Patent Application No. PCT/EP2020/071462, filed on Jul. 30, 2020. PCT Application No, PCT/EP2019/071462, claims priority to GB 19109201.4, filed Jul. 31, 2019, both of which are incorporated by reference herein in their entirety.

FIELD OF THE INVENTION

The invention relates to a mirror clip for use with an optical mirror assembly, in particular an optical mirror assembly for use with an inductively coupled plasma source. The invention also relates to an optical mirror assembly comprising a mirror clip and an optical emission spectrometer comprising such an optical mirror assembly.

BACKGROUND OF THE INVENTION

Plasma sources are commonly used in optical emission and mass spectrometers. In a plasma source, such as in inductively coupled plasma (ICP) sources, plasma is generated at a high temperature, at which atoms and molecules are ionized.

In optical emission spectrometry, vaporized atoms and ions in a plasma are brought to high energy states. The atoms and/or ions subsequently relax to their ground state, during which process they give off radiation with wavelengths that are characteristic of the elements involved and depend on the quantized energy level structure of each atom or ion.

Optical emission spectroscopy is used in numerous applications, such as for determination of metals or other elemental and/or molecular impurities in food, determination of trace elements bound to proteins, in mineral processing, in agriculture such as for nutritional analysis or for trace element analysis in soil, in environmental analysis of liquid or solid samples, in food safety, in pharmaceutical and nutraceutical analysis, in forensics and in various petrochemical applications.

Optical emission spectrometers in general consist of an ICP source, in which samples are vaporized and brought to high energy states, and optics for capturing and detecting the photons that are emitted by the atomic species and ions in the ICP source.

Detection of emitted photons can be performed by radial or side-on viewing of the plasma or by axial or end-on viewing of the plasma. In some instruments, there is combined radial and axial viewing.

The radial viewing is the classical operational mode of optical emission spectrometers. In such instruments, the plasma is observed from the side of the plasma, photons that are emitted by the plasma being sampled from the side. This mode in general results in less spectral and background interference but has lower sensitivity than axial viewing.

The optical path towards the detector typically involves an optical periscope that directs the incoming light towards the detector. The periscope has an internal mirror that deflects incoming light towards the detector, typically by a 90° deflection of the radiation.

Due to the close proximity of the periscope to the plasma and the intense heat and radiation from the plasma, the optical mirror within the periscope may need to be replaced. This operation can be problematic due to geometric constraints of the housing surrounding the ICP source and because the periscope can be quite small. Further, replacement of the mirror can involve loosening connective elements such as screws or the like. In some cases, it may therefore be essential to disassemble the housing holding the ICP source and periscope, to be able to access the periscope for replacement of the mirror within the periscope.

SUMMARY OF THE INVENTION

The present invention seeks to provide a solution to the above disadvantages, by providing a mirror clip that is designed to allow easy replacement of mirrors in optical mirror arrangements, such as periscopes.

In an aspect, the invention relates to a mirror clip for securely and removably positioning and attaching a mirror to an optical mirror housing. The mirror clip comprises (i) a body comprising a mirror seating portion that is adapted to receive at least one mirror; (ii) at least one hinge member, for positioning and attaching the mirror clip onto an optical mirror housing; and (iii) at least one clamping member, for securing the mirror clip to the optical mirror housing.

In another aspect, the invention relates to an optical mirror assembly for use with an inductively coupled plasma source. The optical mirror assembly can in particular comprise (i) an optical mirror housing for receiving and transmitting an optical signal along an enclosed path within the optical mirror housing, the optical mirror housing comprising (a) a first section for receiving and transmitting an optical signal from a plasma source along a first linear path, and (b) a second section, connected to the first section and adapted to transmit the optical signal along a second linear path that is at a non-zero angle to the first linear path; (ii) a mirror receiving seat that is located at the junction between the first and the second section, the mirror receiving seat being adapted to receive at least one mirror for reflecting an optical signal from along the first linear path along the second linear path, the mirror receiving seat further being adapted to provide a snug fit of the at least one mirror to the receiving seat; and (iii) a mirror clip comprising a mirror seating portion that is adapted to receive and hold at least one mirror, the mirror clip being hingedly attachable to the optical mirror housing and adapted to be securely fastened onto the optical mirror housing so that, when secured to the optical mirror housing, a mirror seated in the mirror seating portion in the mirror clip is securely positioned in the mirror receiving seat in the optical mirror housing.

In a further aspect, the invention relates to an optical emission spectrometer, comprising (I) an ICP source; (II) at least one detector; and (III) an optical mirror for directing light from the ICP source towards the detector, the mirror being provided in an optical mirror assembly comprising an optical mirror housing for receiving and transmitting an optical signal along an enclosed path within the optical mirror housing, the optical mirror housing comprising (a) a first section for receiving and transmitting an optical signal from a plasma source along a first linear path; and (b) a second section, connected to the first section and adapted to transmit the optical signal along a second linear path that is at a non-zero angle to the first linear path; the optical mirror assembly further comprising (i) a mirror receiving seat that is provided at the junction between the first and second section, the mirror receiving seat being adapted to receive at least one mirror for reflecting an optical signal from along the first linear path along the second linear path, the mirror receiving seat being adapted to provide a snug fit of the at least one mirror and the mirror receiving seat; and (ii) a mirror clip, comprising a mirror holding seat that is adapted to receive and securely hold at least one mirror, the mirror clip being hingedly attachable to the optical mirror housing and adapted to be securely fastened onto the optical mirror housing so that, when secured to the optical mirror housing, the mirror is securely positioned within the mirror receiving section.

The mirror clip is particularly suitable for use with an optical mirror housing for an optical emission spectrometer. The mirror clip can be adapted to receive and securely hold at least one mirror. It can be advantageous to adapt the clip to the number of mirrors that it is to hold.

The body of the mirror clip can comprise a largely planar structure that is adapted so that the mirror seating portion is provided to receive a mirror. The body can comprise a planar structure that defines a plane, wherein the mirror seating portion is provided to receive a mirror in the plane of the body, or in a plane that is approximately parallel to the plane of the body.

The body can comprise a generally rectangular planar structure. At least one side of such a rectangular structure can have at least a portion that extends away from the central portion of the planar body. For example, along one short side of the body there can be at least one section that is at a non-zero angle to an opposing side of the planar structure.

The body can comprise one or more positioning protrusions that are adapted to define a mirror seating portion of the body. The one or more positioning protrusions can for example be provided as a plurality of protrusions that are arranged to define a mirror seating portion for a mirror having a largely rectangular shape. When so provided, the one or more protrusions can be arranged as one or more protrusions that are arranged to flank at least two opposing sides of a rectangular mirror in the mirror seating portion.

The protrusions can be provided as flaps or folds in the body, or by other means known in the art. For example, the protrusions can be provided as flaps that are cut out from the planar body. For example, the flaps can be provided by making a continuous cut that corresponds to three sides of a rectangle, and bending the thus generated portion upwardly, perpendicular to the plane of the body, so as to generate a flap that extends away from the plane of the body.

In general, the mirror seating portion is preferably defined or structured so that when the mirror clip is mounted onto and attached to an optical mirror housing, the mirror clip serves to guide and position a mirror that is seated in the clip into a mirror receiving seat in the optical mirror housing. For this purpose, it can be advantageous that there is some degree of rotational and/or planar flexibility of the mirror seating portion. This way, there can be room for geometric correction of the positioning of a mirror in the mirror clip so that when the clip is mounted on an optical mirror housing, the mirror will be guided into a receiving seat on the housing, so that there is a snug fit of the mirror within its receiving seat.

The mirror seating portion can comprise one or more mirror securing clamps, for securing a mirror in the mirror seating portion. The mirror securing clamp can be adapted to secure a mirror in the mirror seating portion, and simultaneously provide flexibility to allow the mirror to adjust its orientation relative to the clip body by a movement around at least one axis, preferably by a movement around two axes. The movement can be around an axis that is parallel to the plane of the body. There can be movement allowed around an axis that is parallel to the plane of the body and an axis that is perpendicular to the first axis. There can also, or alternatively, be movement allowed in the plane of the body, or in a plane that is parallel to the plane of the body. Such movements can be in two directions, i.e. in a first direction and also in a second direction that is approximately perpendicular to the first.

The mirror securing clamp can comprise an element that is attached to or comprised within the body. The element can be provided by an approximately T-shaped base element, the T-shaped element being adapted to allow movement of the mirror in the mirror seating portion. The T-shaped element can have a stem portion and an arm portion that is provided at one end of the stem portion, symmetrically and perpendicularly to the stem portion so that it provides two arms that are preferably of equal length. The T-shaped element may be connected to the body at the end of its stem, the arm portion of the T-shaped element being provided at the opposite end of the stem. Consequently, the T-shaped element has flexibility with respect to the plane of the body, in that the T-shaped element can be moved away from the body by rotation around the connecting end of the stem portion that meets the body of the mirror.

Other shapes of the base element are possible as long as the element can provide means for attaching at least one mirror to the element and the element being able to provide for flexibility with respect to the plane of the body, including flexibility of movement perpendicular to the plane of the body. The element can have at least one stem portion, that is secured to or extends from the base of the body, wherein at least a portion of the flexibility of the element is provided by rotational movement of element that is provided by the stem portion, away from or towards the plane of the body.

The mirror securing clamp can be provided so as to be within the plane of the body, or within a plane that is parallel to the plane of the body. The mirror securing clamp (e.g., the stem portion of the mirror securing clamp) can also be provided at a non-zero angle to the body. The angle between the body and the mirror securing clamp can be in the range of 0° to 30°, in the range of 1° to 25°, in the range of 1° to 20°, in the range of 1° to 15°, in the range of 2° to 15°, in the range of 5° to 15° or in the range of 8° to 14°. In an embodiment, the angle between the body and the mirror securing clamp is about 12°. In such embodiments, the mirror securing clamp can be connected to the body by at least one connecting point, the angle being defined as the angle between the planar body and a longitudinal axis of the mirror clamp. The mirror securing clamp can be at a non-zero angle to the body, towards the seating portion, i.e. the clamp can be secured to the body by at least one connecting point in the plane of the body and have a non-zero angle with respect to the seating portion of the body, i.e. away from a planar surface of the body that comprises the seating portion.

The planar body can have an opening that corresponds at least to the geometric shape of the mirror securing clamp. Thus, when provided as a T-shaped base element, the planar body can have a opening that has been cut out from the body that has at least the same dimensions as the T-shaped base element, with exception of the stem end of the T-shaped element, where it is connected to, or represents a part of, the body. In this way, the T-shaped element can be made by cutting it out from the body and bending the connecting end of the stem to bring the T-shaped element outwardly from the plane of the planar body, away from the mirror seating portion.

The mirror securing clamp can comprise at least two resilient securing flaps that are arranged opposite each other so as to accommodate a mirror between them by application of a force to the flaps. For example, there can be two securing flaps arranged at opposite ends of the arm portion of a generally T-shaped securing clamp.

The securing flaps can extend substantially perpendicularly from opposite ends of the arms of the T-shaped base element of the mirror securing clamp.

The at least two resilient securing flaps can comprise two flap ears that are adapted so that the application of force to the flap ears perpendicular to the plane of the body causes bending of at least one of the securing flaps away from the mirror seat to allow insertion of a mirror between the securing flaps. The flap ears can be provided at a distal end of the securing flaps. It can be preferable that the flap ears be provided in a plane that is parallel to, or close to parallel to, the plane of the body. If not parallel to the plane of the body, the flap ears can be pointed away from the body, at angle to the plane of the body that is in the range of 5° to 30°, in the range of 10° to 20°, in the range of 12° to 18° or in the range of 12° to 16°.

The mirror clip can comprise at least one hinge member that is adapted to engage the same number of complimentary hinge members on an optical mirror housing. In some embodiments there are two hinge members on the mirror clip and two complimentary hinge members on the optical mirror housing. The hinge members can comprise hooks that can be oppositely arranged on the mirror body near an end thereof, the hooks being adapted to engage hinge pins on an optical mirror housing.

It can be preferable that the hinge members and clamping member of the mirror clip extend approximately perpendicularly away from the plane of the body.

Further, the hinge members and clamping members can be provided to extend away from the plane of the body so that, when the mirror clip is placed in an inverted orientation on a flat surface with a mirror mounted thereon (i.e., with the mirror facing the flat surface), the mirror does not touch the flat surface.

As will be appreciated, the mirror clip is adapted to be secured to an optical mirror housing through a rotational movement of the mirror clip via the at least one hinge member and secured to the optical mirror housing via the at least one clamping member.

The clamping member can be configured so that the clamping member can, when the mirror clip is engaged with an optical mirror housing, secure the mirror clip to the optical mirror housing.

The clamping member is preferably resilient so that the clamping member can be secured to a complimentary receiving portion of a housing, such as an optical mirror housing. There can be a flap or ear provided at a distal end of the clamping member that is adapted so that when force is applied to the flap, approximately perpendicularly to the plane of the body, the clamping member can be forced onto a receiving portion of an optical mirror housing. Likewise, for removing a mirror clip from an optical mirror housing to which it has been attached, the clamping member can be released due to its resilient nature by applying force to the flap or ear approximately perpendicularly to the plane of the clip body, thereby allowing the mirror clip to be removed from the optical mirror housing.

The mirror clip can be made from any material that is resilient yet chemically and physically strong enough to withstand conditions of normal use, e.g. in an ICP optical spectrometer. The mirror clip can for example be made of stainless steel or similar alloys. The mirror clip can be made from a single material or it can, when assembled from different parts, be made from different materials.

The mirror clip in accordance with the invention can be used with an optical mirror assembly. In general, the mirror clip can be used with any optical mirror assembly that requires use of an internal mirror to direct incoming radiation along two paths that are at an angle (non-zero) with respect to each other. The mirror clip can in particular be used with an optical mirror assembly for use with an inductively coupled plasma source.

An optical mirror assembly according to the invention is an assembly that has a mirror receiving seat for redirecting light that enters the assembly along a first linear path in a first section of an optical mirror housing for receiving and transmitting an optical signal along a second linear path in a second section, wherein the first and second linear paths are at a non-zero angle. At the junction, where the first and second sections meet, there is a mirror receiving seat that is adapted to accommodate a mirror to reflect optical signals that enter the assembly via the first section to leave the assembly through the distal end of the second section.

It can be preferable that the first and second sections are provided as a single continuous structure during use, so that photons pass through a continuous enclosed path within the first and second sections. The optical mirror housing can be assembled, such that the first section, the second section or parts thereof are provided as separate structural units that are assembled to generate a functional mirror assembly.

The angle between the first and second sections will in general be approximately 90°. It will be appreciated that the invention is not limited to this configurations. Accordingly the first and second sections can be at an angle that is not 90°, such as an angle in the range of 70° to 110°, in the range of 75° to 105°, in the range of 80° to 100°, or in the range of 85° to 95°. It can however be preferable that the first and second sections be perpendicular to one another, i.e. the angle between the sections be 90°.

The mirror receiving seat on the optical mirror housing is preferably provided so that a mirror can be mounted in the seat and removed from the seat without need for disassembling the optical mirror housing. The mirror receiving seat can thus be provided on an outside surface of the optical mirror housing, preferably at the junction between the first and second sections. If the first and second sections are in a perpendicular orientation, the mirror receiving seat is preferably in a plane that is at a 45° angle to the first and second section. It will be appreciated that for different geometries of the first and second sections, the angle of the mirror receiving seat will be correspondingly different. Thus, when the angle between the first and second section is 80°, the angle between the plane of the mirror receiving seat and the first and second sections will be 50°, and when the angle between the first and second section is 120°, the angle between the plane of the mirror receiving seat and the first and second sections will be 30°, and so on.

The optical mirror assembly can comprise a hinging mechanism that is adapted so that a mirror clip can be hingedly attached to the optical mirror housing. The hinging mechanism can be provided by hinge pins on the optical mirror housing, such as by two hinge pins that are adapted to engage hinge members of the mirror clip, thereby providing for a hinged connection of the mirror clip to the optical mirror housing. The hinge members can be provided as hooks or the like that can engage the hinge pins to provide a rotatable connection of the mirror clip to the optical mirror housing.

The optical mirror assembly can be furthermore adapted to receive a clamping member on the mirror clip, to secure the clip to the optical mirror housing. The clamping member and the optical mirror housing can thus be adapted so that a clamping member on the mirror clip can engage the optical mirror housing to lock the mirror clip to the optical mirror housing. As the mirror clip is moved into position, a mirror in the mirror clip is guided into and secured to the mirror receiving seat in the optical mirror housing. Thereby, a mirror can be mounted on and secured to an optical mirror housing, providing a functional optical mirror assembly.

The optical mirror housing can in preferred embodiments be provided with a mirror clip as described herein.

An optical mirror assembly according to the invention can be particularly useful for assembly in an optical emission spectrometer, in which the optical mirror assembly is oriented radially to the inductively coupled plasma (ICP) source. A particularly useful embodiment is where the optical mirror assembly is arranged so that the second section is vertical or near vertical. When so arranged, the optical mirror in the optical mirror assembly is in a upwardly orientation, i.e. the mirror is at an upward angle with respect to the ICP source. In such a configuration, there is reduced likelihood of debris from the ICP source falling onto the mirror, which would adversely impact its function.

Moreover, when the second section of the optical mirror assembly is vertical or near vertical, the mirror clip can be attached to the optical mirror housing via a simple two-step mechanism, wherein the mirror clip is first connected to the hinging mechanism on the optical mirror housing (e.g., by connecting hooks on the clip to hinge pins on the optical mirror housing), followed by a second rotational movement, where the mirror clip is rotated via the hinging mechanism towards a locked position. During this movement, a mirror seated in the mirror clip is guided into the mirror receiving seat on the optical mirror housing. After locking the mirror clip to the optical mirror housing by means of e.g. a securing clamp, the mirror is securely positioned in the optical mirror housing.

A mirror can be removed from the optical mirror housing by reversing these steps, i.e. by first moving the locking mechanism to an open position (e.g., by loosening the securing clamp), rotating the mirror clip to release the mirror from the mirror receiving seat, followed by removing the mirror clip from the hinging mechanism on the optical mirror housing. An optical mirror can therefore by removed and replaced swiftly and securely without the requirement of any tools or external fastening means, such as screws or the like.

The above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
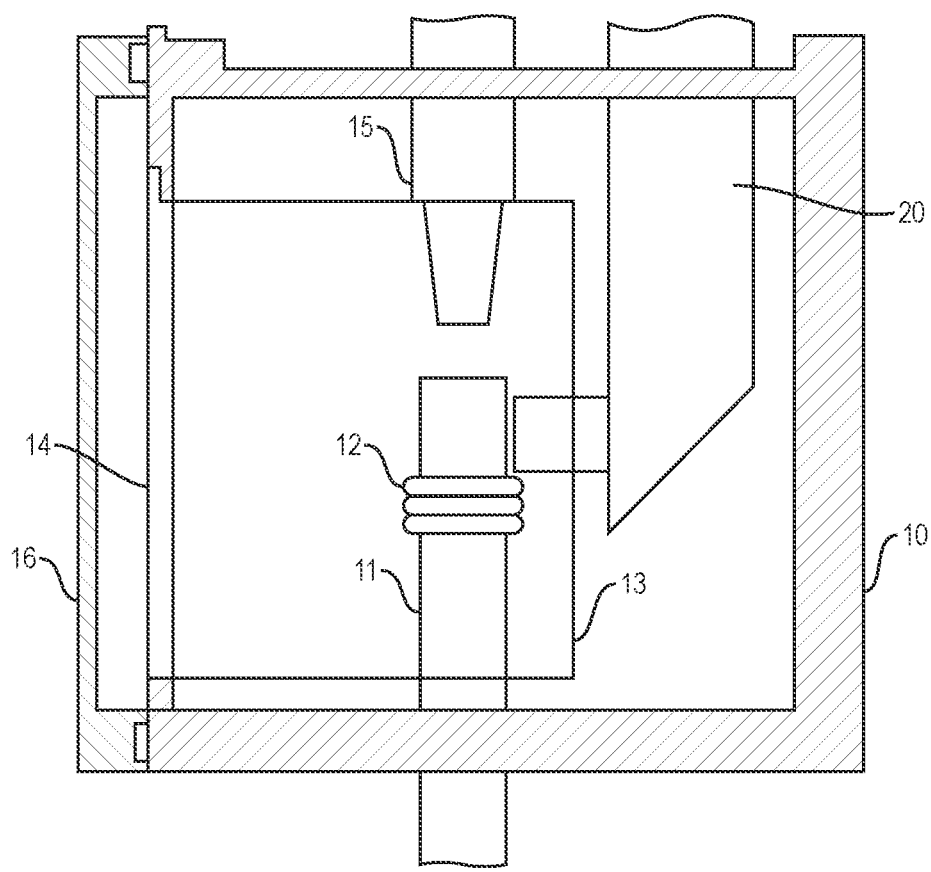
FIG. 1 shows a diagram of an inductively coupled plasma housing, with an ICP torch and axial and radial viewers, in which a mirror clip may be used.

Referring to FIG. 1, there is schematically shown a part of an optical emission spectrometer. It shows an inductively coupled plasma source 11 that typically comprises three concentric tubes (only the outermost tube being shown in this view). A plasma coil 12 is arranged around the tubes so that when an RF voltage is applied to the coil, the gas flowing through the concentric tubes, including the sample being analysed, is heated to a very high temperature. After ignition, the sample is vaporized and forms excited atomic and ionic species that, when they relax back to their ground states, give off electromagnetic radiation with characteristic frequency for the atomic species in question.

The plasma source is provided in a housing unit that has two components, an outer housing 10 and an inner housing 13. The advantages of a two-part housing as illustrated are disclosed in co-pending patent application GB1905069.9. In short, the two part-housing provides for efficient air flow through the housing, thereby cooling the outer surface of the plasma source chamber while at the same time minimizing the detrimental effects of such air flow on the plasma. Door mechanisms 14,16 provide access into the housing unit.

Axial viewing element 15 and radial viewing element 20 are arranged axially and radially to the plasma torch 11. There can be a single axial viewing element 15, a single radial viewing element 20, or there can be both an axial and a radial viewing element.

Viewing element 15 extends from the inner plasma housing 13, near the plasma torch 11, through the outer housing 10 and towards a downstream detector (not shown). The viewing element 20, here represented by an optical mirror assembly 20, also extends from the inner housing, adjacent to and radial to the plasma torch, through the outer housing and towards a downstream detector (not shown). The optical mirror assembly 20 has a 90° bend within the outer housing assembly, so that the assembly exits the housing assembly 10 approximately parallel to the viewing element 15.

As will be appreciated, the dimensions of the plasma housing are such that there is little space to manoeuvre, for example when replacing or servicing individual components in the housing. In particular, it can be difficult to reach the back of the housing, which is necessary for replacing the internal mirror in viewing element 20, here represented by an optical mirror assembly 20.

Figure 2:
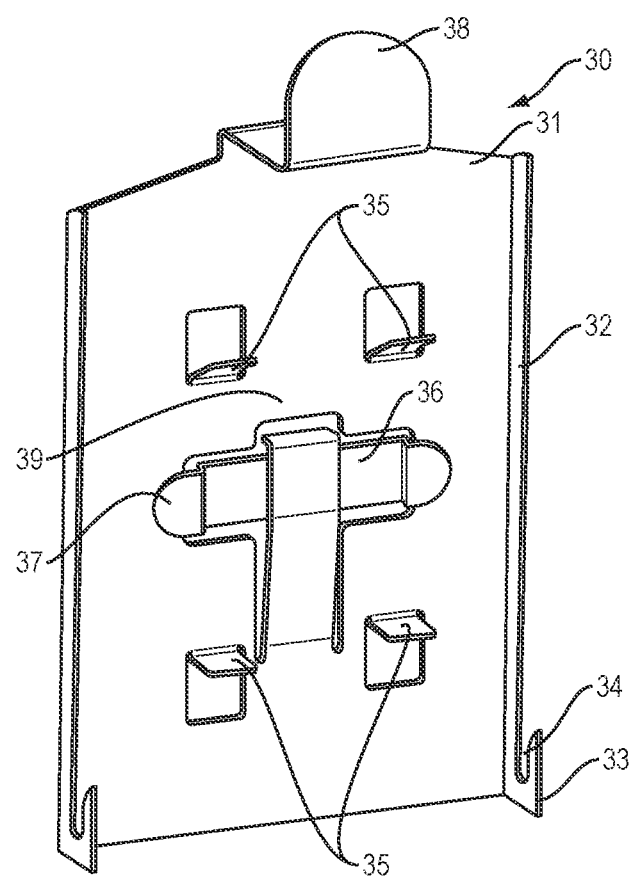
FIG. 2 shows a view of an exemplary embodiment of a mirror clip in accordance with the invention.

Turning to FIG. 2, there is shown a front view of a mirror clip 30. The mirror clip has an essentially flat body 31, within which there is a centrally placed mirror seating portion defined by mirror securing clamp 36 and flaps 35. The mirror seating portion of the mirror clip 30 is the part of the mirror clip that is designed to receive and hold a mirror.

The mirror seating portion is defined by protrusions, here exemplified by flaps 35 that extend approximately perpendicularly from the plane of the body. The flaps are here shown as having been machined from the body 31 by making a U-type cut in the body and bending the resulting flaps outwardly. It will be appreciated that any other means for providing protrusions or flaps can be used, as long as the resulting protrusions or flaps can serve the purpose of holding a mirror in the correct position on the mirror clip body.

Although the mirror seating portion is defined so as to receive a mirror in a relatively snug manner, it can be beneficial to leave room for a small amount of movement of the mirror within the mirror seating portion. This can be advantageous when the mirror clip with mirror attached is mounted on an optical mirror, as there is some flexibility for allowing the mirror, that is mounted in the mirror seating portion on the mirror clip, to slide into the very snug mirror receiving seat on the optical mirror housing, when the mirror clip is secured onto the optical mirror housing.

Accordingly, it can be beneficial to leave room for a small amount of movement of the mirror in the mirror seating portion. The movement that is allowed can be in the range of 0.1 to 1.0 mm, such as 0.1 to 0.8 mm, such as 0.1 to 0.7 mm, such as 0.2 to 0.5 mm. In an embodiment, the movement can be about 0.25 mm.

The free movement can be predominantly between oppositely located protrusions or flaps. In other words, the free movement can be predominantly in a plane that is parallel to the plane of the mirror clip body, in a direction that is defined by the oppositely arranged protrusions or flaps.

A mirror is further secured to the mirror clip by means of a mirror securing clamp 36. The clamp in the embodiment shown is designed as a generally T-shaped structure that is attached to the body of the mirror clip, or represents a continuation of the body, the clamp being essentially formed by cutting or machining out a T-shaped portion from the planar body. Other embodiments having a different overall structure (e.g., X-shaped or other geometrical shapes) are also possible. The T-shaped element can be made from two pieces, for example by welding a transversal portion ("arm") to a stem portion. The clamp is configured so that its clamping portion is located approximately centrally in the mirror seating portion, in between the two pairs of protrusions or flaps 35. At each transversal end of the "T" structure there is provided an ear or flap 37 that is an extension of the transversal portion of the clamp but seated approximately parallel to and vertically from the plane of the body. The T-shaped clamp is a part of or mounted to the body at its stem end. The body of the mirror clip has an opening that corresponds to at least the stem of the mirror securing clamp. As a consequence, the clamp can move in a direction perpendicular to the plane of the body. The clamp is preferably made from a resilient material, such as a metal (preferably stainless steel or the like). As force is applied to the ears or flaps 37, perpendicular to the body 31, the clamp will therefore move towards the body, and simultaneously the distal portion of each end of the transversal portion ("arm") of the clamp will move away from an opposing end, i.e. an opposing end of the transversal end (arm) of the clamp. Thereby, room to place a mirror in the mirror seating portion is generated.

Figure 3:
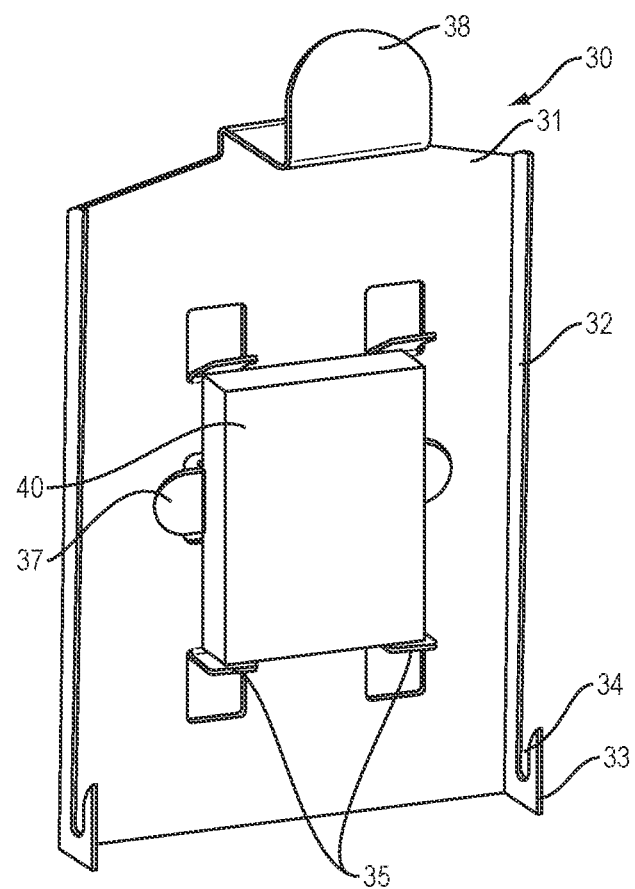
FIG. 3 shows a view of a mirror clip in accordance with the invention, with a mirror mounted on the mirror clip.

In FIG. 3 there is shown a mirror clip as illustrated in FIG. 2 and described in the above, with a mirror 40 being arranged in the mirror clip. As can be seen, the mirror 40 is secured in the mirror seating portion of the mirror clip and is held in place by flaps 35 and mirror securing clamp 36. The position of the mirror, once positioned and secured in the mirror clip, can be altered through slight movement in the plane of the body and relative to the flaps 35. There is also slight rotational movement possible away from or towards each pair of flaps 35, the mirror still being secured to the mirror clip via the mirror securing clamp 36.

Once a mirror is positioned in the mirror seating portion, as shown in FIG. 3, it is held in place by the mirror securing clamp 36 (of which only the distal ends ("ears 37") are visible in this view) and the two sets of protrusions or flaps 35. Due to the resiliency of the clamp, and the fact that it is connected to the body of the mirror clip via its stem, the clamp, and thereby the mirror seated in the clamp, can move relative to the rest of the mirror clip body.

The mirror clip further comprises hinge members, here provided by hooks 33 on the mirror clip. The hooks are preferably provided on opposite sides of the mirror clip body, near or at an end of the body. The hooks are designed so as to be able to engage complementary pins on an optical mirror housing (see item 23 in FIG. 6). As a consequence, the mirror clip can be mounted on the mirror housing by guiding hooks 33 onto complimentary pins 23, so that the pins rest within mouths 34 of opposing hooks.

Additional movement of the mirror in the mirror seating portion can be provided by rotational movement of the mirror, after the mirror has been placed in the mirror clip, where it is held in place by the mirror securing clamp 36. Thus, the clamp can be adapted so that the mirror, following its placement in the clamp, can rotate by a few degrees around an axis that is perpendicular to an axis connecting two opposing flaps 35 in the mirror seating portion. This way, the mirror, in addition to being able to move slightly between opposing flaps, can also rotate slightly around an axis that is perpendicular, or close to perpendicular, to an axis that connects two opposing flaps. The allowable rotational movement can be in the range of 0.5° to 5°, preferably 1° to 5°, more preferably 1° to 4°, more preferably 1° to 3°.

Figure 4:
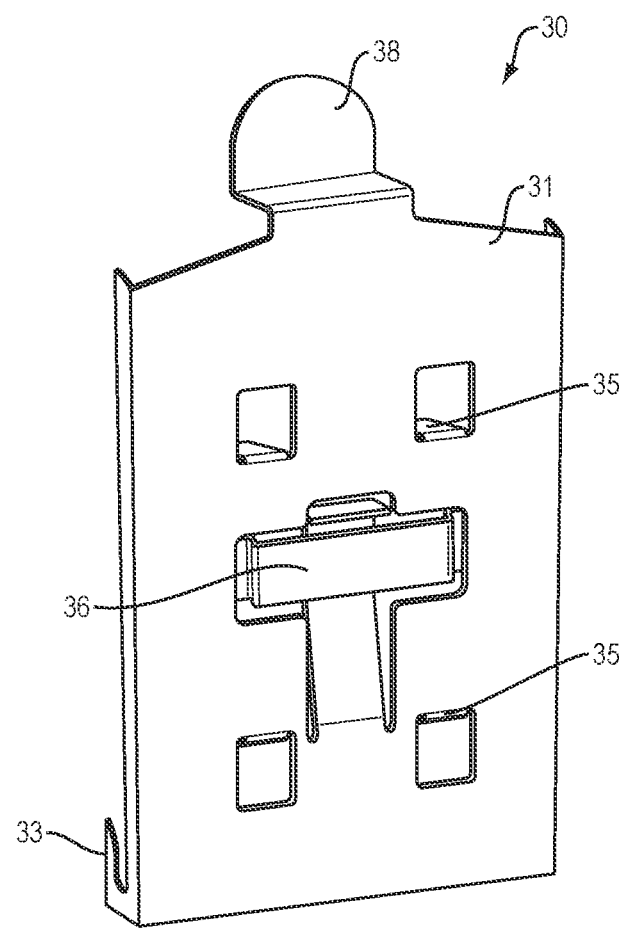
FIG. 4 shows an outer view of a mirror clip in accordance with the invention.

The mirror securing clamp can furthermore be provided so the clamp is at a non-zero angle to the plane of the body 31. Thus, the mirror securing clamp can be connected to the body via its stem end, as shown in FIG. 2, away from the plane of the body, i.e. towards the viewer, as shown in FIG. 2. This embodiment is shown more clearly in FIG. 4, which shows a back view (outside view) of the mirror clip. Thus it can be seen that the mirror securing clamp 36 is connected to the body of the mirror clip at a non-zero angle towards the inner part of the clamp, i.e. towards the mirror seating portion of the clamp. This configuration serves the role of providing additional functionality for securing the mirror to the mirror receiving seat 24 of a complimentary optical housing.

The T-shaped element can be made from a single piece that can be connected to or extend from the plane of the body. The T-shaped element can also consist of, or comprise, two pieces that are welded together, such that the arm portion is welded to the stem portion.

As a mirror clip is mounted to an optical mirror housing via hooks 35 and complimentary pins 23 on the optical mirror housing, and the mirror clip is rotated on the optical mirror housing towards a closed configuration, the mirror which now sits in the mirror seating portion at a slightly inwardly and angular position with respect to the plane of the mirror body, is guided into the mirror receiving seat of the optical mirror housing. The flexibility of movement of the mirror within the mirror seating portion of the mirror clip allows for adjustment of the mirror so that the mirror can safely slide into its receiving seat 24. The mirror receiving seat is configured so that the position of the mirror is thereby well-defined. Preferably, there is a very snug fit of the mirror in the mirror receiving seat, i.e. the mirror receiving seat is designed to receive a mirror with minimal space between a mirror in the mirror receiving seat and the optical mirror housing. The inwardly (towards the optical mirror housing) angular rotation of the mirror securing clamp and the resilient nature of its material and connection to the mirror clip body serves to provide force onto the mirror as the mirror clip is moved to a closed position on the optical mirror housing. As the mirror clip is locked to the optical mirror housing via clamping member 38, the spring force provided by the mirror securing clamp 36 on the mirror clip and the clamping member 38 pushes the mirror into the receiving seat 24 and holds the mirror securely in place as the mirror clip is moved to a locked position by means of the clamping member 38.

A mirror that is seated in the mirror seating portion can thus have positional flexibility that is defined by (1) movement in the plane of the body, between opposing mirror holding flaps, (2) rotational movement around an axis that is perpendicular to an axis between opposing mirror flaps, and (3) wriggling room of the clamp itself, due to its resilient nature and its connection to the mirror clip body via its stem end, the wriggling room being defined by movement perpendicular to the plane of the body and movement in the plane of the body, or in a plane that is parallel to the plane of the body. By virtue of this freedom of movement, a mirror seated in the mirror seating portion can be securely accommodated in its mirror receiving seat on an optical mirror housing via rotational movement of the mirror clip around the hinging mechanism connecting the mirror clip and the optical mirror housing.

Clamping member 38 is used to secure a mirror clip to an optical housing on which it has been mounted. The clamping member 38 preferably extends away from the plane of the body, as shown in FIG. 2. Guiding hooks 33 preferably also extend away from the plane of the body, in the same general direction as the clamping member. As a consequence, once a mirror clip with mounted mirror is placed on a flat surface with the mirror facing the surface, the mirror clip will come to rest on hooks 33 and clamping member 38. The surface of the mirror does not touch the surface, which is important for secure handling of the mirror when being prepared for loading onto an optical housing. The clamping member further has a handling portion or "ear" that is approximately parallel to the plane of the mirror clip body, for directing the clamping member into and from a locked position.

The guiding hooks are provided at the ends of opposing brims 32 that are provided at opposing end of the body 31, along the edge of each long side of the approximately rectangular body. The hooks 33, and the mouths 34 of each hook, are in the embodiment shown in FIG. 2 an integral part of a continuous structure of the rims 32 that in turn are part of a continuous part of the body of the mirror clip, in a general direction that is perpendicular to the plane of the body 31. The rims 32 have the additional advantage of providing structural rigidity to the clip.

Figure 5A:
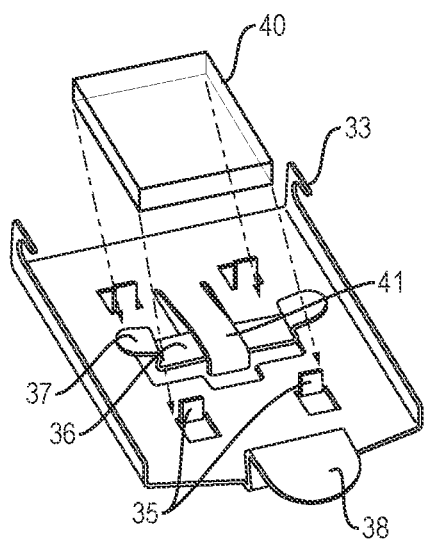
FIG. 5 shows (a) a mirror clip in accordance with the invention, the arrows indicating placement of a mirror in the clip; (b) a closeup view of the mirror seating portion, the arrows indicating securing flaps for holding the mirror; (c) a side view of the mirror clip with mirror in place, the mirror clip sitting on a flat surface with the mirror facing the surface.
Figure 5B:
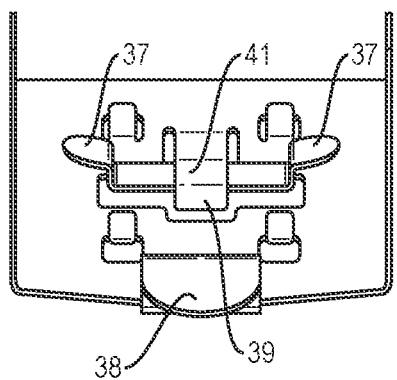
Figure 5C:
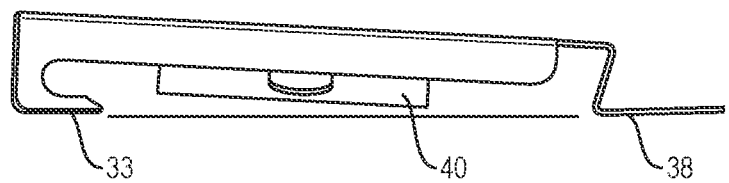

Turning to FIG. 5, there is shown in (A) a mirror clip 30 according to the invention, the arrows indicating how a mirror can be inserted into the mirror seating portion of the mirror clip, to be held in place by flaps 35 and mirror securing clamp 36. In (B), there is a close-up view of the mirror clip from an end-on perspective. By applying force to flap ears 37 on the mirror securing clamp 36, the clamp 36, which is in its resting state at an angle with respect to the plane of the body 31, is forced towards the plane of the body. The clamp can be seen to have a stem portion 41 and transversal arms that provide the clamping functionality of the clamp via flap ears 37. The flap ears 37 can furthermore be seen to be pointed away from the body of the mirror clip, i.e. the flap ears are not parallel to the plane of the body. The resilient nature of the clamp, in particular the stem portion 41 leads to the clamp serving at least two roles, in that the clamp secures a mirror to the mirror seating portion, and the clamp furthermore provides a force through the spring-like functionality of the stem portion 41 so that when the mirror clip is engaged with an optical mirror housing, the mirror clip forces the mirror into a mirror receiving seat on the optical mirror housing. The stem portion provides the spring-like force that secures the mirror in the optical mirror housing. The stem portion further has at its distal end a portion 39 that is bent downwardly, away from the mirror seating portion. The bended portion has the role of preventing the stem portion from being bent excessively when a mirror is placed in the mirror seating portion, as force is applied to the mirror securing clamp, thereby bending the clamp downwardly (towards a flat surface on which the mirror clamp can be placed when placing a mirror in the mirror clamp). In (C), there is shown a side view of a mirror clip that has been inverted onto a flat surface with a mirror attached to the mirror clip. As can be seen, the mirror does not touch the surface on which the mirror clip rests; the mirror clip rests at one end on the clamping member 38 and at the other on hooks 33. This is an important functionality of the mirror clip, as it ensures that the mirror clip can be placed on a flat surface during handling without contamination being transferred from the flat surface onto the mirror.

Figure 6:
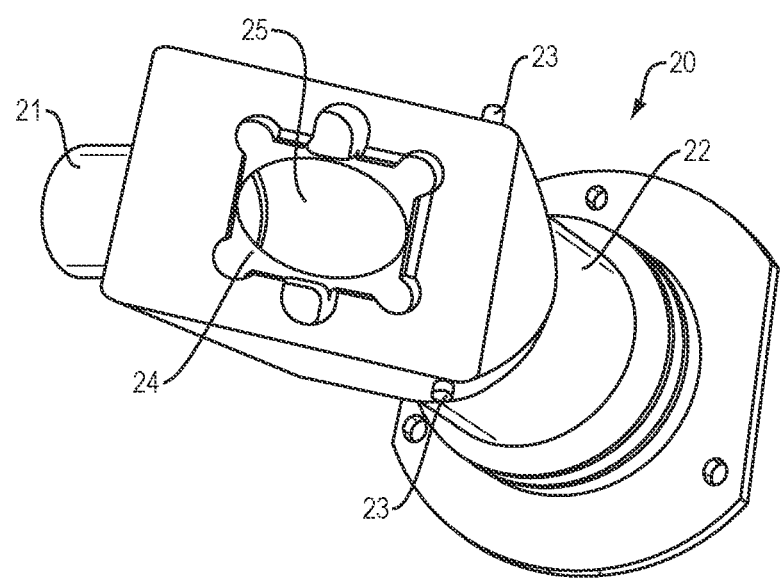
FIG. 6 shows an optical mirror housing in accordance with the invention.

Turning to FIG. 6, there is shown an optical mirror assembly 20, having an optical mirror housing that comprises a first section 21 and a second section 22. The second section is oriented substantially perpendicularly to the first section. At the meeting point of the first and second section there is a mirror receiving seat 24, which surrounds an oval-shaped opening 25 through which there is a view along the first and second section 21,22. On the optical mirror assembly there are pins 23 that are placed near an outer edge of the portion of the assembly where the first and second sections meet. The pins are adapted so that complimentary hooks on a mirror clip can slip onto the pins, so as to allow a mirror clip to be attached to the optical mirror housing and act as a hinge.

Figure 7:
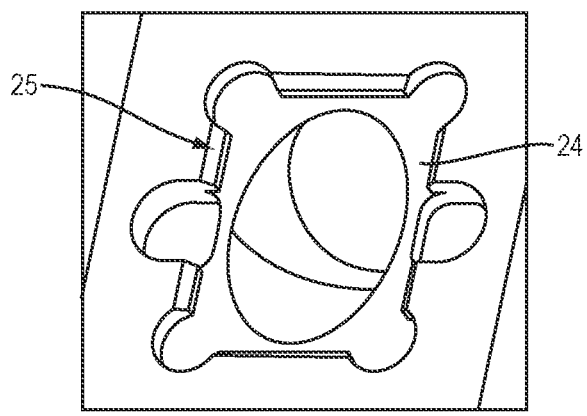
FIG. 7 shows a closeup view of the mirror receiving seat of the optical mirror housing.

A close-up view of the mirror receiving seat 24 is shown in FIG. 7. The seat 24 is constructed to allow a mirror to be guided into the seat so that there is a very snug fit of the mirror to the seat. The seat is machined into the optical mirror housing so that, viewed from the outside, there is a sloping portion or chamfer 25 that leads into a vertical portion that defines the boundaries of the mirror receiving seat. Through this construct, a mirror can be safely guided into the seat, with any mirror deviations in placement of the mirror as it is aligned with the seat being corrected by the chamfer 25 to guide a mirror into its correct placement in the mirror receiving seat.

Figure 8A:
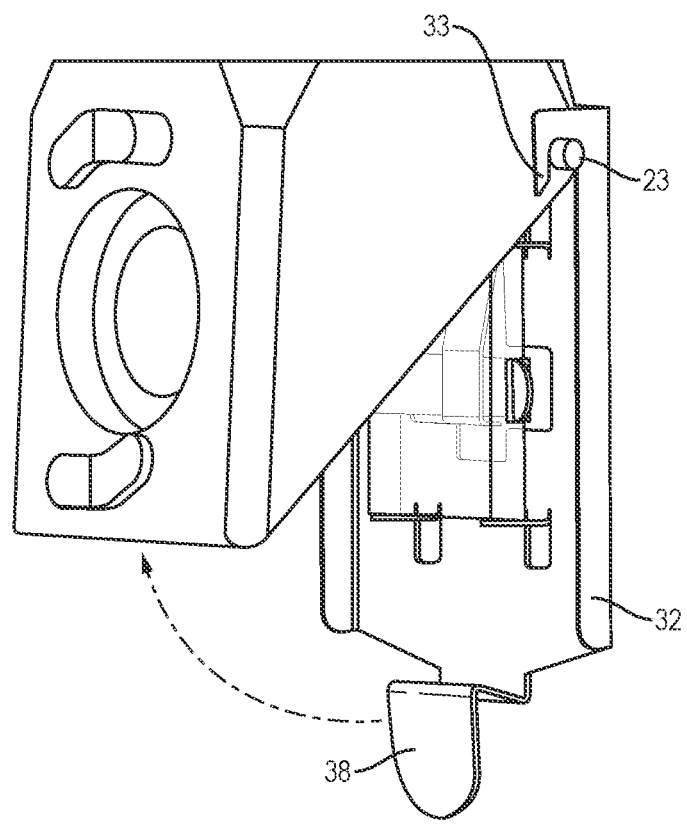
FIGS. 8A & 8B show a mirror clip in accordance with the invention mounted on an optical mirror housing, and a mirror clip in accordance with the invention secured to an optical mirror housing respectively.
Figure 8B:
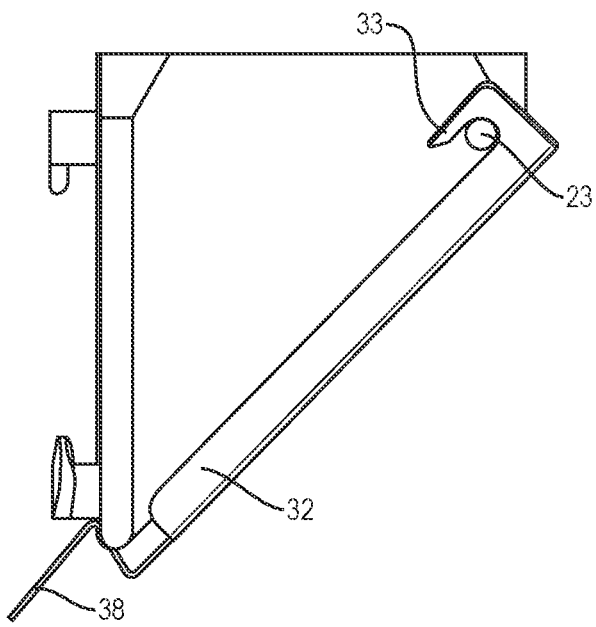

Turning to FIG. 8A, there is shown a perspective view of the portion of the optical mirror assembly where the first section meets the second section (a portion of the first section not being shown in this view). The outlines of a mirror in the mirror receiving seat can be seen, the mirror in this view being otherwise shown as transparent. It can be convenient to arrange an optical mirror housing so that the second portion of the optical mirror assembly is pointed vertically. In such an embodiment, the first section is horizontal, and the second section therefore vertical. A mirror clip can be attached to the mirror housing by sliding the mirror clip (shown with a mirror outlines only in this view) via its hooks 33 onto complimentary pins 23 on the mirror housing. Subsequently, the mirror clip can be rotated by a forward (towards the first section) and upward movement until the clamping member 38 meets the optical mirror housing. At this point, the clamping member is forced onto the optical mirror housing by pressing onto the clamping member 38 and/or the mirror clip 30 and at the same time move the mirror clip (holding a mirror during normal use) towards the optical mirror housing. The clamping member will then engage with the optical mirror housing to lock the mirror clip in a closed position, as shown in FIG. 8B.

When the mirror clip is engaged with an optical housing via the hinging system that consist of the hooks 33 and pins 23, the mirror, which is seated in the mirror seating portion of the mirror clip, held by the mirror securing clamp 36 and the flaps 35, can be adjusted as the mirror clip is rotated via hooks 33 and pins 23 towards a closed and locked position. The positional flexibility of the mirror in the mirror seating portion of the mirror clip thus ensures that the mirror can fit snugly into the mirror receiving seat 24 of the optical mirror housing during the locking process.

A major advantage of the mirror clip of the present invention is that it can be mounted and secured to an optical mirror housing without use of any tools. Moreover, the mirror clip can be mounted by using one hand only of a user. This is particularly important when replacing mirrors in an ICP housing. Such housings tend to be quite small, with very little room for manoeuvring and therefore it can be very difficult to replace or adjust parts in this confined space, especially when using tools.

An added advantage is that by having several openings in the body of the mirror clip, ventilation of the mirror during use will be aided. This is expected to prolong the lifetime of the mirror.

The construct as shown herein is designed to allow for quick and secure removal, placement and orientation of a mirror in an optical housing within a confined space. As described in the foregoing, the mirror clip and its complimentary optical mirror housing have several advantages that act in a concerted fashion to allow safe mounting of a mirror:

- The mirror clip has a mirror seating portion that can receive and hold a mirror, while allowing for slight horizontal and vertical movement of the mirror;
- A mechanism engages the mirror clip with an optical mirror housing by using a single hand movement;
- A mirror receiving seat is adapted to receive a mirror, the seat being designed with a chamfered edge to direct the mirror into its proper orientation in the seat, through a small movement of the mirror in its mirror seating portion on the mirror clip, as the mirror clip is moved towards a closed position on the optical mirror housing;
- A clamping function secures the mirror clip to the optical mirror housing by using a single hand movement;
- The mirror can be mounted on the mirror clip outside of the instrument, while only a single manipulation by hand is needed to mount the mirror onto the mirror clip and the housing;
- No adapters or guides are needed to load the mirror into the milled surface (mirror seat) of the optical mirror housing.

Thus, a mirror in an optical mirror assembly can be removed from, and mounted on, the optical mirror housing using a single hand. No tools, screws or other parts are needed to remove, mount or secure the mirror clip to the optical mirror housing in its desired exact position.

It will be apparent to the skilled person that various alternative arrangements of hooks or other means for securing the mirror clip to an optical housing are possible. Functional requirements of hooks, when provided on the mirror clip, and complimentary pins on the optical mirror housing are that the hooks and pins must be functionally operable, i.e. that the mirror clip can be mounted onto the pins via the hooks provided on the mirror clip.

It is also possible that a hook-pin arrangement is provided in an inverse configuration, i.e. with pins provided on the mirror clip, and complimentary hooks or other receiving means such as receiving holes, are provided on the optical mirror housing. Again, many such configurations are possible and within scope of the present invention, as long as the pins and complimentary hooks or holes are functionally connectable, i.e. that the pins can be engaged to the hooks or holes in order to connect and secure the mirror clip to the optical mirror housing.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A mirror clip for securely and removably positioning and attaching a mirror to an optical mirror housing, the mirror clip comprising:
   a body comprising a mirror seating portion that is adapted to receive at least one mirror;
   at least one hinge member, for positioning and attaching the mirror clip onto an optical mirror housing; and
   at least one clamping member, for securing the mirror clip to the optical mirror housing;
   wherein the body comprises at least one positioning protrusion that defines the mirror seating portion of the body.

2. The mirror clip of claim 1, wherein the body further comprises a largely planar structure, and wherein the mirror seating portion is adapted for receiving a mirror in, or approximately parallel to, the largely planar structure of the body.

3. The mirror clip of claim 2, wherein the mirror seating portion is defined so that, when the mirror clip is being attached onto an optical mirror housing, the mirror clip serves to guide and position a mirror that is seated in the mirror seating portion into a mirror receiving seat in the optical mirror housing.

4. The mirror clip of claim 1, wherein the mirror clip further comprises at least one mirror securing clamp, for securing a mirror in the mirror seating portion.

5. The mirror clip of claim 4, wherein the mirror securing clamp is adapted to secure the mirror to the mirror seating portion and simultaneously allow the mirror to adjust its orientation relative to the body by a movement around at least one axis, preferably by a movement around two axes.

6. The mirror clip of claim 5, wherein the mirror securing clamp comprises an approximately T-shaped base element that is attached to, or comprised within, the body, the T-shaped base element being adapted to allow the movement around the at least one axis.

7. The mirror clip of claim 6, wherein the mirror securing clamp comprises at least two resilient securing flaps that are arranged opposite each other so as to accommodate a mirror between them by application of a force to the flaps.

8. The mirror clip of claim 7, wherein the at least two resilient securing flaps comprise two flap ears that are adapted so that the application of a force to the flap ears perpendicular to a plane of the body causes bending of the securing flap away from the mirror seat to allow insertion of a mirror between the securing flaps.

9. The mirror clip of claim 8, wherein the securing flaps extend substantially perpendicularly from opposite arm portion ends of the T-shaped base element of the mirror securing clamp.

10. The mirror clip of claim 1, wherein the hinge members comprise hooks oppositely arranged on the body near an end thereof, the hooks being adapted to engage hinge pins on an optical mirror housing.

11. The mirror clip of claim 1, wherein the hinge members comprise hinge pins oppositely arranged on the body near an end thereof, the hinge pins being adapted to engage hooks on an optical mirror housing.

12. The mirror clip of claim 1, wherein the mirror seating portion is provided in a generally planar body, and wherein the hinge members and clamping member extend away from a plane of the body so that, when the mirror clip is inverted on a flat surface with a mirror mounted thereon, the mirror does not touch the flat surface.

13. The mirror clip of claim 12, wherein the hinge members and clamping member extend approximately perpendicularly away from the plane of the body.

14. The mirror clip of claim 1, wherein the mirror clip is adapted to be secured to an optical mirror housing through a rotational movement of the mirror clip via the at least one hinge member and secured to the optical mirror housing via the at least one clamping member.

15. An optical mirror assembly for use with an inductively coupled plasma source, the optical mirror assembly comprising:
   an optical mirror housing for receiving and transmitting an optical signal along an enclosed path within the optical mirror housing, the optical mirror housing comprising:
      a first section for receiving and transmitting an optical signal from a plasma source along a first linear path, and
      a second section, connected to the first section and adapted to transmit the optical signal along a second linear path that is at a non-zero angle to the first linear path;
   a mirror receiving seat that is provided at a junction between the first and the second section, the mirror receiving seat being adapted to receive at least one mirror for reflecting, along the second linear path, an optical signal received along the first linear path, the mirror receiving seat further being adapted to provide a snug fit of the at least one mirror to the receiving seat; and
   a mirror clip comprising a mirror seating portion that is adapted to receive and hold at least one mirror, the mirror clip being hingedly attachable to the optical mirror housing and adapted to be securely fastened onto the optical mirror housing so that, when secured to the optical mirror housing, a mirror seated in the mirror seating portion in the mirror clip is securely positioned in the mirror receiving seat in the optical mirror housing.

16. The optical mirror assembly of claim 15, wherein the angle between the first and second section is in the range of 60° to 120°.

17. The optical mirror assembly of claim 16, wherein the second section is approximately perpendicular to the first section.

18. The optical mirror assembly of claim 15, wherein the mirror clip comprises a clamping member that is adapted to allow the mirror clip to be locked to the optical mirror assembly.

19. The optical mirror assembly of claim 15, wherein the optical mirror housing further comprises at least two hinge pins that are adapted to engage hinge members of the mirror clip, so as to hingedly attach the mirror clip to the optical mirror housing.

20. The optical mirror assembly of claim 15, wherein the optical mirror housing further comprises at least two hinge members that are adapted to engage at least two hinge pins of the mirror clip, so as to hingedly attach the mirror clip to the optical mirror housing.

21. The optical mirror assembly of claim 15, further comprising a mirror that is mounted and secured in the mirror clip.

22. An optical emission spectrometer, comprising
   I. an ICP source;
   II. at least one detector; and
   III. an optical mirror for directing electromagnetic-radiation from the ICP source towards the detector, the mirror being provided in an optical mirror assembly comprising an optical mirror housing for receiving and transmitting an optical signal along an enclosed path within the optical mirror housing, the optical mirror housing comprising:
   a first section for receiving and transmitting an optical signal from a plasma source along a first linear path; and
   a second section, connected to the first section and adapted to transmit the optical signal along a second linear path that is at an angle to the first linear path; the optical mirror assembly further comprising:
   a mirror receiving seat that is provided at a junction between the first and second section, the mirror receiving seat being adapted to receive at least one mirror for reflecting, along the second linear path, an optical signal received along the first linear path, the mirror receiving seat being adapted to provide a snug fit of the at least one mirror and the mirror receiving seat; and
   a mirror clip, comprising a mirror seating portion that is adapted to receive and securely hold at least one mirror, the mirror clip being hingedly attachable to the optical mirror housing and adapted to be securely fastened onto the optical mirror housing so that, when secured to the optical mirror housing, the mirror is securely positioned within the mirror seat of the optical mirror housing.

23. The spectrometer of claim 22, wherein the optical mirror assembly is arranged radially relative to the plasma source.

* * * * *